March 7, 1939.  S. S. WOLFF  2,150,112
AUTOMATIC REGULATING SYSTEM FOR BATTERY OPERATED MOTOR-GENERATOR SETS
Filed April 8, 1938
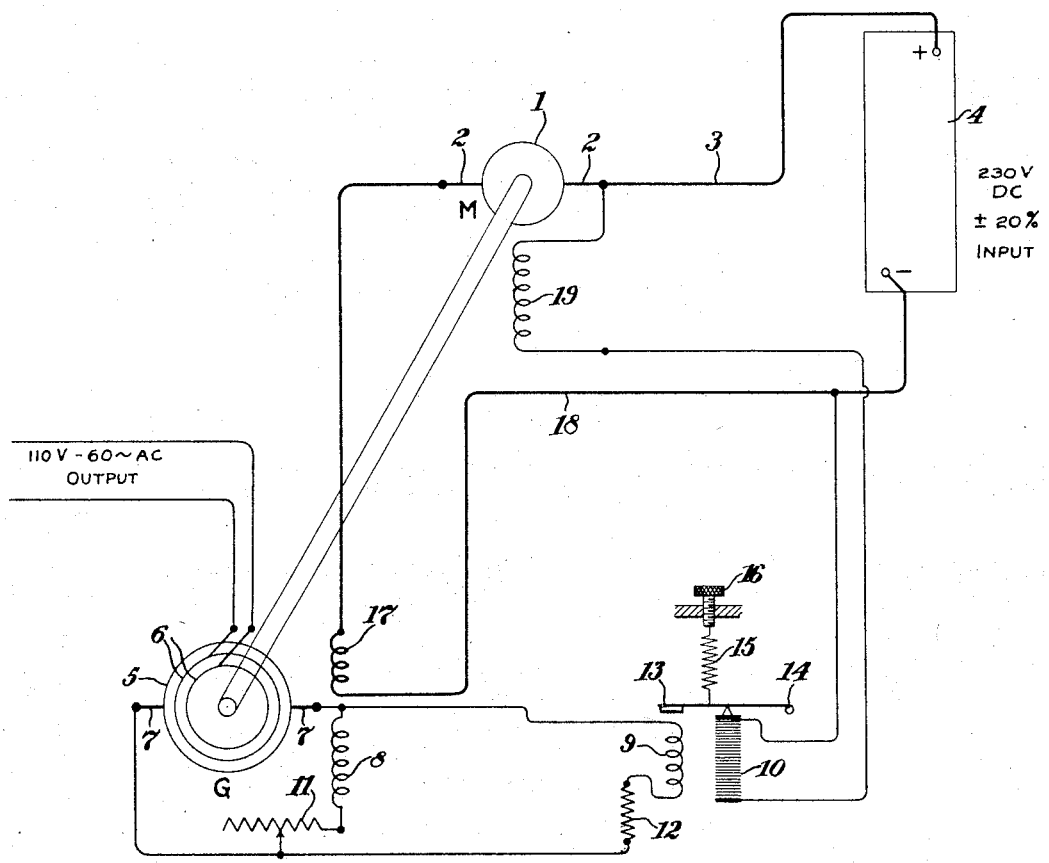
Inventor
Samuel S. Wolff
Witness:
John H. Cave
By Henry J. Miller
Attorney Patented Mar. 7, 1939

2,150,112

UNITED STATES PATENT OFFICE 2,150,112

AUTOMATIC REGULATING SYSTEM FOR BATTERY OPERATED MOTOR-GENERATOR SETS

Samuel S. Wolff, Elizabeth, N. J., assignor to The Singer Manufacturing Company, Elizabeth, N. J., a corporation of New Jersey Application April 8, 1938, Serial No. 200,633

5 Claims. (Cl. 171—123)

This invention relates to motor-generator sets and has for an object to provide an automatic regulating system therefor, whereby the motor-generator set may be operated from a direct-current supply of widely variable voltage to supply an alternating current at a substantially constant frequency and voltage, suitable for energization of a conventional public address system.

With the above and other objects in view, as will hereinafter appear, the invention comprises the devices, combinations, and arrangements of parts hereinafter set forth and illustrated in the accompanying drawing of a preferred embodiment of the invention, from which the several features of the invention and the advantages attained thereby will be readily understood by those skilled in the art.

In the accompanying drawing, the figure represents, diagrammatically, a motor-generator set with an automatic regulating system embodying the invention.

In the preferred embodiment of the invention illustrated, M represents the motor of a motor-generator set MG. The motor M comprises a conventional direct current armature 1 with commutator brushes 2, 2, one of which is connected by the line 3 to one terminal of the storage battery 4.

The generator G, which is self-excited, has an armature the winding of which has the usual taps running to the commutator 5 and is also tapped at points 180 electrical degrees apart to supply the output slip rings 6. Thus the generator armature may be of the conventional type used in rotary converters but is not used as a rotary converter in the present instance. Bearing on the generator commutator 5 are the brushes 7, 7 across which are connected the generator shunt field winding 8 and the voltage-responsive solenoid 9 of a conventional carbon-pile regulator or rheostat 10. An adjustable rheostat 11 is preferably connected in the generator shunt field circuit while the current in the regulator voltage-responsive solenoid 9 may be limited, if necessary, by the resistance 12. By a suitable choice of the size of wire for the coil 9, the resistance 12 may, of course, be dispensed with.

The regulator solenoid 9 is arranged to attract a regulator lever 13 which is pivoted at 14 and exerts pressure upon the carbon pile 10 to lower the electrical resistance thereof. A biasing spring 15 connected to the lever 13 and having an adjusting screw 16 whereby its tension may be regulated, is arranged to act upon the regulator lever 13 in opposition to the solenoid 9.

The generator G also has a series type field winding 17 which is connected in the line 18 running from the other terminal of the storage battery 4 to the other motor brush 2.

The motor has a shunt field winding 19 which is connected in series with the carbon-pile regulator 10 across the motor suply lines 3, 18 which are energized by the battery 4.

It will be understood that the storage battery will supply to the motor a direct current at a voltage which will vary over wide limits, depending upon the state of charge of the battery. Notwithstanding the widely variable nature of the voltage of the supply circuit, the output voltage and frequency at the generator slip rings will remain substantially constant at various loads on the generator.

Consider, first, the circuit shown, with the series field coil 17 not functioning. Inasmuch as the voltage on the regulator coil 9 varies directly with the voltage at the slip rings 6, it follows that, when an output load is applied to the slip rings 6, the slip ring voltage will drop due to generator armature reaction and the regulator will weaken the motor field to speed the generator above no load speed sufficiently to maintain constant voltage at the slip rings. Thus, without the series type field coil 17 the generator speed will rise with the load on the slip rings 6. The function of the series type field coil 17 is to sufficiently strengthen the generator field with the load, so that the generator speed need not be increased to maintain constant voltage at the slip rings but may remain substantially constant at variable output loads.

Thus, the regulator, in combination with the series type field coil 17, functions to maintain substantially constant voltage at substantially constant frequency at the slip rings.

The motor shunt field winding 19 is preferably so designed as to work the motor-field iron in the sensitive region below the knee of the saturation curve thereof, so that the motor field regulation will be sensitive to variations in the voltage across the brushes 7, 7 of the generator.

By adjusting the generator shunt field rheostat 11 and regulator biasing spring screw 16, the generator output voltage across the slip rings 6 may be raised or lowered, as desired, and will be held substantially constant by the present regulating system at any set output voltage, within the range provided for.

Having thus set forth the nature of the invention what I claim herein is:

1. In a battery-operated motor-generator set, the combination with a storage battery, of a shunt-wound direction current motor connected to the terminals of said battery, a carbon pile regulator connected in series with the field of said motor across the terminals of said battery, said regulator having a voltage-responsive regulating solenoid and means under the influence of said solenoid for compressing the carbon pile of said regulator, a self-excited alternating current generator driven by said motor and including an armature winding tapped to feed into a pair of slip rings and a commutator, brushes bearing on said commutator, a shunt generator field winding connected across said brushes, the voltage-responsive solenoid of said carbon-pile regulator being also connected across said brushes, said generator also having a field winding of the series type connected in one leg of the line between the battery and motor.

2. In a battery operated motor-generator set, the combination with a storage battery and a shunt-wound direct current motor connected to be energized by said battery, of a self-excited alternating current generator driven by said motor and having an armature winding which is tapped for both alternating current and direct current outputs, said generator having a shunt field winding connected across the direct current output terminals thereof and a series type field winding connected in one leg of the motor supply circuit, and a carbon pile regulator connected in series with the motor shunt field winding and having a voltage-responsive regulating solenoid connected across the direct current output terminals of said generator.

3. The combination with a shunt-wound motor connected to be operated by a direct current supply circuit, of a self-excited alternating current generator driven by said motor and having alternating current and direct current output terminals, a carbon pile regulator connected in series with the shunt field of said motor and having a voltage-responsive regulating coil connected across the direct current output terminals of said generator, said generator having a shunt field winding connected across the direct current output terminals thereof and a series type field winding connected in one leg of the direct current supply circuit to said motor, and means to vary the alternating current output voltage of said generator including a variable resistance in the generator shunt field and an adjustable biasing spring in said carbon pile regulator opposed to the voltage-responsive coil of the latter.

4. The combination with a storage battery and a shunt-wound motor connected to be operated by said battery, of a self-excited alternating current generator driven by said motor and having alternating current and direct current output terminals, a carbon pile regulator connected in series with the shunt field winding of said motor and having a voltage-responsive regulating coil connected across the direct current output terminals of said generator, said generator having a shunt field winding connected across the direct current output terminals thereof and a series type field winding connected in one leg of the battery circuit to said motor, the motor shunt field winding being so designed as to work the motor field iron at magnetic densities below the knee of the saturation curve thereof.

5. In a motor-generator set, the combination with a shunt-wound direct current motor, a self-excited alternating current generator driven by said motor, and a direct current supply circuit for said motor, of an automatically variable rheostat in the shunt field of said motor, said rheostat having a voltage-responsive regulating coil connected to said generator, said generator having shunt and series type field windings, the latter being energized by the direct current drawn by said motor from said supply circuit.

SAMUEL S. WOLFF.

CERTIFICATE OF CORRECTION.

Patent No. 2,150,112.  March 7, 1939.

SAMUEL S. WOLFF.

It is hereby certified that error appears in the printed specification of the above numbered patent requiring correction as follows: Page 1, second column, line 9, for "suply" read supply; page 2, first column, line 5, claim 1, for "direction" read direct; and that the said Letters Patent should be read with this correction therein that the same may conform to the record of the case in the Patent Office.

Signed and sealed this 4th day of April, A. D. 1939.

(Seal)

Henry Van Arsdale
Acting Commissioner of Patents.